May 7, 1957 — D. W. ALCOTT — 2,791,245
EVACUATING APPARATUS
Filed July 12, 1955 — 3 Sheets-Sheet 1

INVENTOR.
DAVID W. ALCOTT
BY
Morgan, Finnegan, Durham & Pine
ATTORNEYS

May 7, 1957
D. W. ALCOTT
2,791,245
EVACUATING APPARATUS
Filed July 12, 1955
3 Sheets-Sheet 2
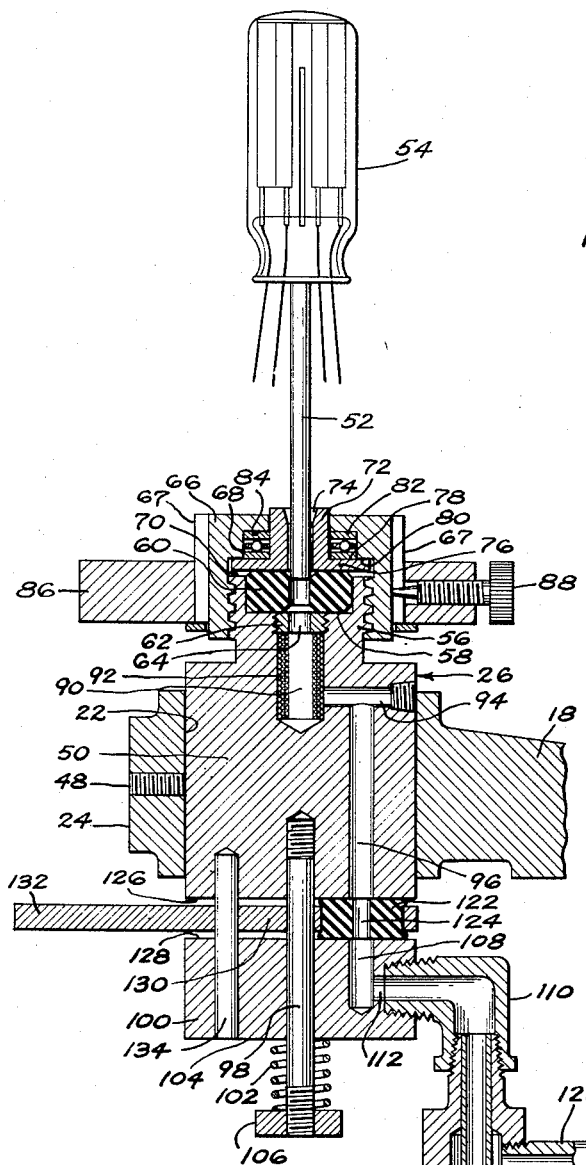
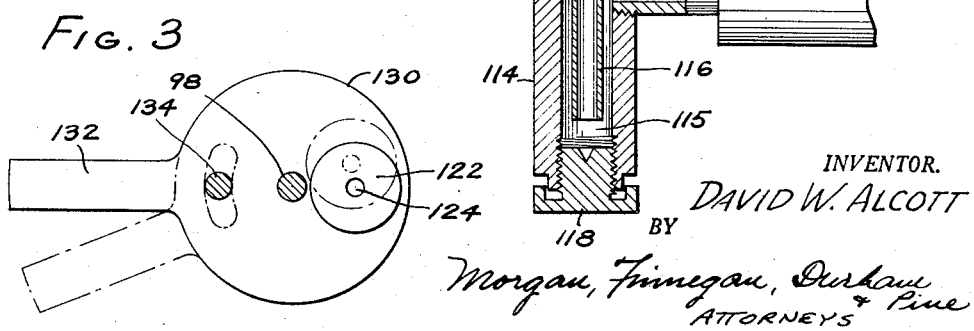
INVENTOR.
DAVID W. ALCOTT
BY
Morgan, Finnegan, Durham & Pine
ATTORNEYS May 7, 1957  D. W. ALCOTT  2,791,245
EVACUATING APPARATUS
Filed July 12, 1955  3 Sheets-Sheet 3

INVENTOR.
David W. Alcott
BY
Morgan, Finnegan, Durham & Pine
ATTORNEYS

United States Patent Office 2,791,245
Patented May 7, 1957

2,791,245

EVACUATING APPARATUS

David W. Alcott, Hillside, N. J.

Application July 12, 1955, Serial No. 521,487

8 Claims. (Cl. 141—65)

The invention relates to evacuating apparatus and more particularly to mechanisms for shutting off an evacuating head from a source of vacuum whenever a leak is detected in the article being evacuated.

In constructing evacuating apparatus it is common practice, at least in the vacuum tube evacuating art, to provide a rotatable platform, or table, and to place a plurality of individual vacuum heads about the periphery of the table. The size of the table and the number of heads are selected so as to give the apparatus a good production rate at a reasonable speed and without making the apparatus too large. In order to achieve a maximum rate of production the apparatus is usually run at its top speed and at these maximum production speeds the time that each article spends at a station is very small. Consequently, it becomes very important to be able to shut off any leaking article from the vacuum source as quickly as possible. Failure to do so will result in losing not only the "leaker" but one or two of the following "good" articles. This is because three or four of the stations are usually connected to one vacuum source, hence, if this vacuum is lost due to a "leaker," there is insufficient time to restore the vacuum for all of the three or four articles and some of the "good" articles will be insufficiently evacuated.

Heretofore, in the case of vacuum tube evacuators it has been the general practice to provide for shutting off of the individual tube heads by providing a mechanical pinching mechanism for each head which pinches the hose connection together in the case of a leak. In the usual construction each head is provided with a length of thick-walled rubber hose that leads downwardly from the underside of the head to a glass oil trap. This trap is of the type in which the exit conduit for the trap is at substantially right angles to the entrance conduit. The exit conduit is inserted into another length of hose that leads to the main valve for the apparatus.

This construction has many serious disadvantages. Due to the fact that the rubber hose is directly under the head any particles of broken glass from the tubes— and there is always a considerable amount of breakage in inserting the tubes into the head—can pass directly into the rubber hose where it becomes trapped at the point of squeeze-off. This results in many fine particles of glass becoming imbedded in the walls of the hose, either working entirely through the wall to form leaks, or else, becoming lodged between the opposing jaws of the pinching device where they prevent a perfect close-off. Because of this danger it has been customary to service the machines at very frequent periods and this servicing has required the complete replacement of the rubber hoses for each head. The replacement of these hoses presents a difficult, time-consuming job, and one that is hazardous as well, because of the danger of breaking the glass traps in removing the rubber hoses. In addition to the maintenance and down time problems, this construction is disadvantageous in that the squeezing of the rubber hose requires a very strong force because the wall thickness of the hose is very great. All parts of the cut-off mechanism have to be made very large and bulky in order to provide the required strength.

The applicant's invention successfully overcomes these disadvantages and provides a shut-off mechanism which is faster in action, practically maintenance free and less costly to service. In the applicant's structure the squeezing action has been eliminated and replaced by a more positive action. Applicant's structure also eliminates the necessity for the rubber hose and the glass trap and the consequent necessity of servicing these items. Furthermore, the applicant's invention prevents any particles of broken glass from getting to the cut-off point and all of the heavy parts of the prior art mechanism have also been replaced by a simple, fast-acting mechanism. Where the prior device required frequent service periods of relatively long duration and presented substantial costs in replacement parts and considerable danger of injury in their installation, the present invention provides a device that rarely requires service but which can be serviced quickly and safely and at a negligible cost. In addition, the present device is faster acting and less complicated to manufacture.

Briefly and generally, the above-enumerated advantages are achieved by a construction in which the point of cut-off is located within the head itself and the cut-off action is achieved by placing, in the evacuation passageway, a movable section whereby the passageway may be interrupted whenever a leak is detected in a tube. Preferably this section is formed in a resilient and compressible body which will effectively seal off the cut-off point from the atmosphere without requiring an auxiliary sealing structure and the travel of the section is kept small so that the action may be fast and a light construction utilized. Additionally, a trap is positioned between the tube-receiving part of the head and the point of cut-off so as to preclude any possibility of small particles of glass finding their way to the cut-off. A second trap, for oil, is also provided and is adapted to be directly connected to a head that is only moderately increased in size over the size of prior head assemblies.

While the foregoing brief description, and the following detailed description, have reference to vacuum tube evacuation apparatus it is to be understood that the invention is not limited to this application alone. Reference to this type of apparatus is merely for the purpose of illustrating a preferred embodiment of the applicant's invention.

Of the drawings:

Fig. 2 is a sectional view through one of the heads provided on the apparatus shown in Fig. 1;

Fig. 3 is a detail view of that part of the head of Fig. 2 where the shut-off is effected.

Figure 1:
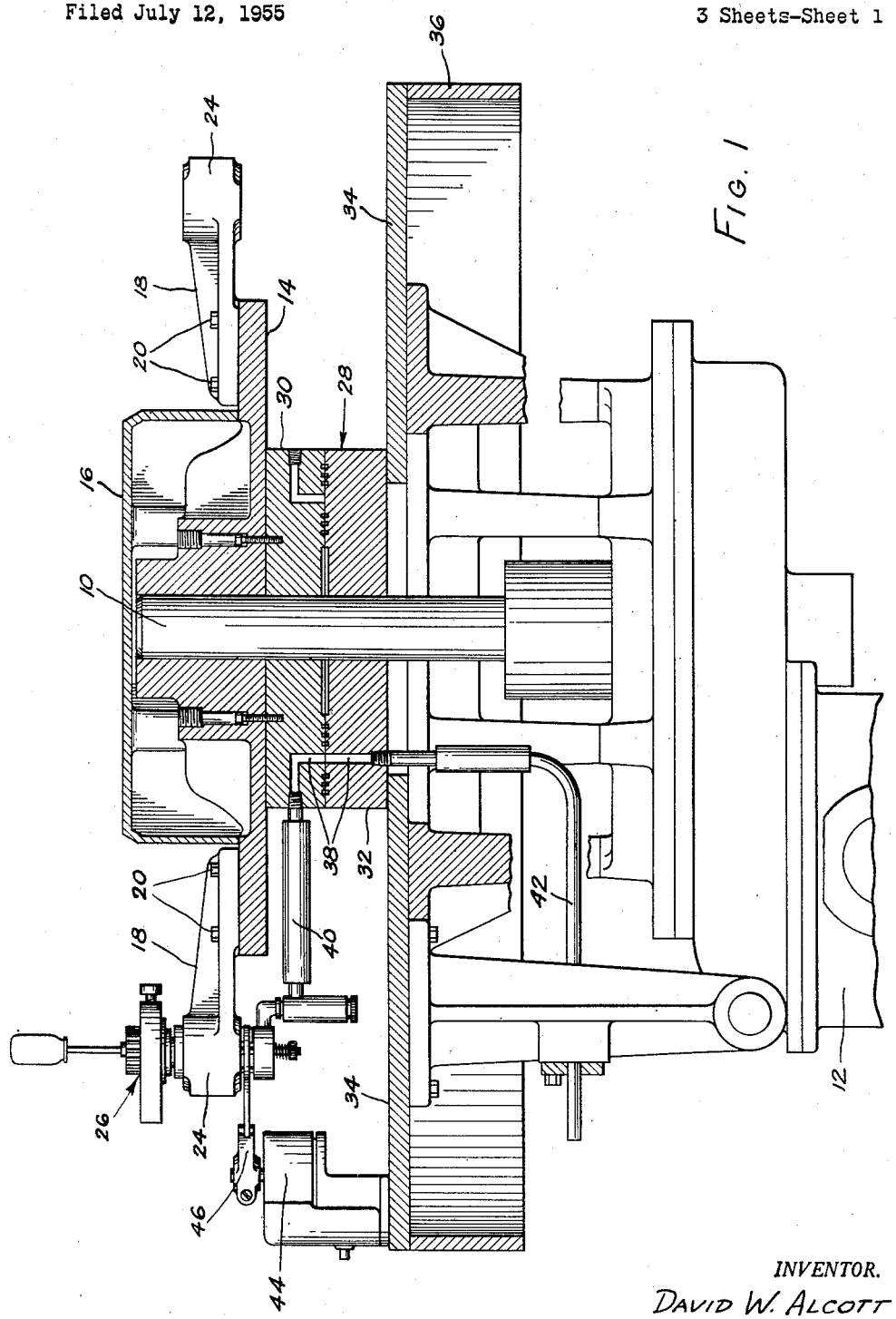
Fig. 1 is a vertical section through an evacuating machine embodying a preferred form of the invention.

Referring now to the drawings for a detailed description of a preferred embodiment of the invention, and at first to Fig. 1, there is shown, for illustrative purposes, a vacuum tube evacuation apparatus. The apparatus comprises a large rotary shaft 10 driven by any suitable source of power (not shown) located in the base 12. Mounted on the upper end portion of the shaft 10 for rotation therewith, is a generally circular table 14 and a housing 16 fits over the shaft 10 and rests on the table. A series of spokes 18 are equally spaced about and bolted to the periphery of the table 14 by the bolts 20, each spoke being provided with an opening 22 in the outer end 24 thereof. As will be described in greater detail hereinafter these openings are each adapted to receive a tube head 26. A large valve 28, having a rotary upper portion 30 and a stationary lower portion 32, is provided at the center of the apparatus and on the upper surface 34 of the stationary platform 36. The valve 28 is provided with various passageways 38 which communicate the tube heads 26 with a vacuum source (not shown) in proper sequence through the conduits 40 and 42. Adjacent the tube-testing station of the main valve 28 is a rotary solenoid 44 having a pivotable lever 46 mounted on the top thereof to actuate the shut-off mechanisms in the tube heads 26 as will be described in detail later on.

Turning now to Fig. 2, each tube head 26 is located in the opening 22 formed in the outer end portion 24 of a spoke 18 and held therein by means of the set screw 48 which bears against the main body member 50. At its upper end the main body member 50 is provided with means for receiving and holding the evacuation stem 52 of a tube 54 which is to be evacuated. To this end a threaded neck 56 is provided at the upper end of the main body member 50 and a recess 58 is provided in the upper end of the threaded neck. Seated within the recess 58 in the neck is an annular rubber washer, or ring, 60. Immediately below the ring 60 is a threaded insert 62 also provided with an opening 64. A cap 66, having its outer edge formed in a series of serrations 67, is threaded onto the neck 56 and is provided with an internal recess 68 forming a chamber 70 within the cap just above the threaded neck 56. A guide 72 for the evacuation stem 52 of the tube 54 is located within the chamber 70, said guide having a chamfered bore 74 adapted to receive the stem 52. The lower end of the guide 72 is formed as an enlarged circular base 76, the upper surface 78 of which abuts against a shoulder 80 on the cap 66. Relative rotation of the cap 66 with respect to the guide 72 is provided for by a bearing 82 located between the upper surface 78 of the guide base 76 and the bottom 84 of the cap recess 68. A lever 86 fits over the serrated cap 66 and is selectively locked thereto by means of a set screw 88.

The tube stem 52 is first inserted into the bore 74 of the guide 72 until it bears against the rubber ring 60 as shown in the drawing. Thereafter the tube 54 is automatically pushed downwardly thereby thrusting the stem 52 through the ring 60 and into the bore 64 of the threaded insert 62. Lever 86 is then rotated to screw down the cap 66 on the threaded neck 56 and, in so doing, the base 76 of the guide 72 is brought down against the rubber ring 60 thereby compressing it. Compression of the ring 60 causes it to close in about the stem 52 thereby sealing it off from the atmosphere. The tube 54 is then ready to be evacuated.

Immediately below the insert 62 the main body member 50 is provided with a chamber 90. Positioned within the chamber and bearing against the walls thereof is a fine mesh cylindrical wire screen 92. Leading off from the chamber 90 at a point above the chamber bottom is a passageway 94 which leads to another passageway 96 that terminates in the lower end of the main body member 50.

A secondary body member 100 is provided below the main body member 50 and is secured thereto by means of a bolt 98 threaded into the main body member. The secondary member 100 is slidable on the bolt 98 but is constantly urged toward the main member 50 by a spring 102 interposed between the under surface 104 of the secondary member 100 and a nut 106 on the end of the bolt 98. The secondary member 100 has a passageway 108 in alignment with the passageway 96 in the main body 50 and, at one side, has an angle fitting 110 which communicates with passageway 112. An oil trap 114 is screwed into the lower end of fitting 110, said trap being provided with an internal chamber 115 and a long tube 116 extending downwardly into the chamber adjacent the removable plug 118 which forms a bottom therefor.

A conduit 120 leads off from the upper part of the chamber 115 and connects the chamber with conduit 40 leading into the vacuum source for the head.

Interposed between the main body member 50 and the secondary body member 100 is a resiliently compressible washer, 122. Preferably the washer 122 is made from rubber but any suitable material which is resilient and compressible may be utilized, instead. Washer 122 is provided with a passageway 124 which is somewhat smaller in diameter than the passageways 96 and 108 but which is normally in alignment with these passageways so as to form a connecting passageway therebetween. Due to the tension of the spring 102 the washer is maintained under a sufficient amount of compression to form a seal with the surfaces 126 and 128 on body members 50 and 100. The washer is mounted in a lever arm 130 which is generally circular in form and has a handle-like extension 132. Lever arm 130 is pivotally mounted on the bolt 98, said pivotal movement being limited by a pin 134 secured in members 50 and 100. Movement of the extension 132 pivots lever arm 130 about the bolt 98 and moves passageway 124 in washer 122 out of alignment with passageways 96 and 108.

Figure 4:
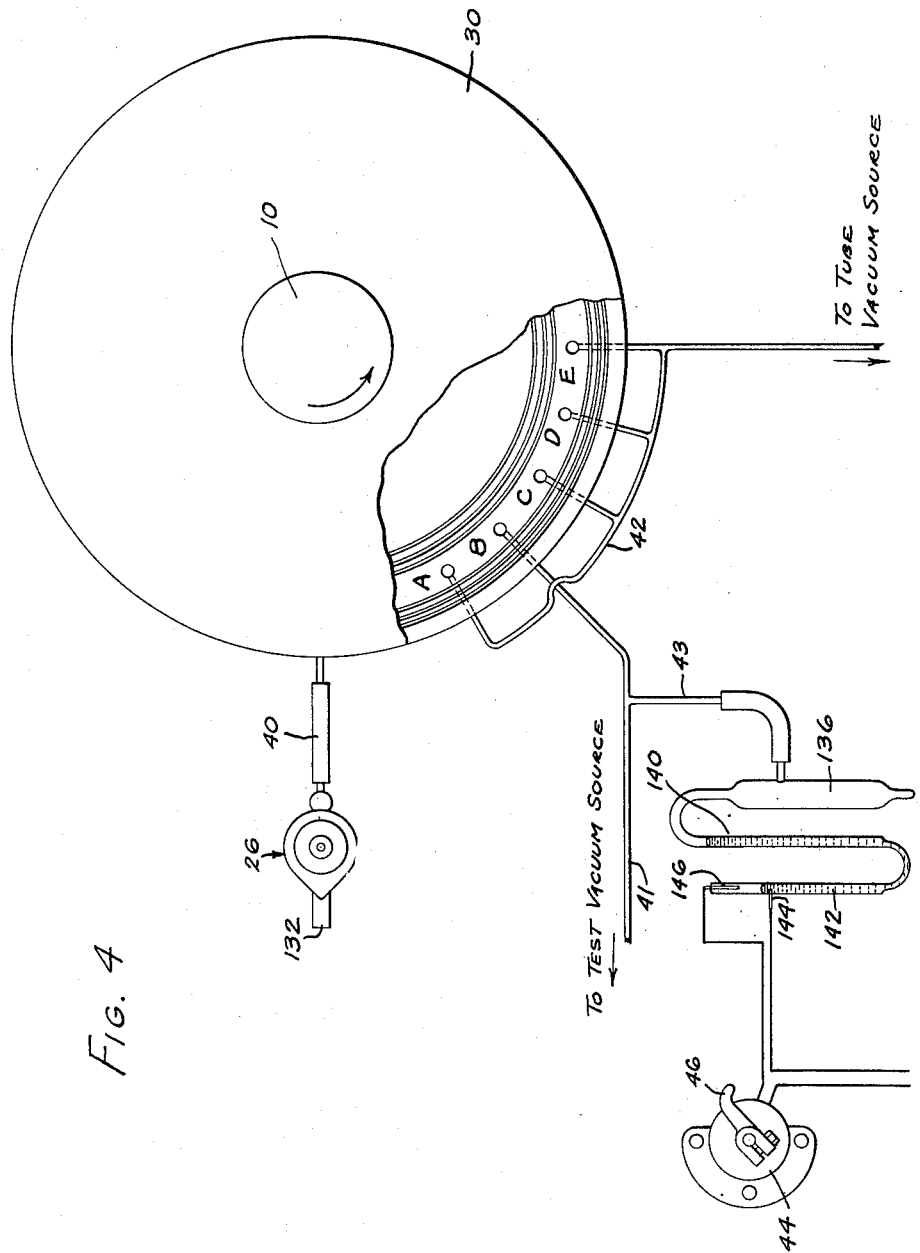
Fig. 4 is a schematic view of the leak-detecting apparatus.

The leak detecting means and actuating means for the lever arm are shown schematically in Fig. 4. A portion of the main valve 28 is broken away so as to show the various passageways and conduits by which the first evacuation and testing of the tubes is accomplished. Only a portion of the cycle of operation will be described as the remaining steps, such as flushing with inert gas, further evacuation and testing and sealing off, need not be described to understand the present invention.

Stations A, C, D, and E are evacuation stations and are all connected to a common vacuum source by the conduits 42 while station B is the test station and is connected to a separate vacuum source and to the leak detecting device by conduits 41 and 43 respectively. Conduit 43 terminates in the enlarged portion 136 of a mercury manometer and subjects the right hand column 140 of mercury to the vacuum from the source. This causes the left hand column 142 of mercury to fall below the top of the tube and to break contact with the electrical contacts 144—146 placed in the side and top of the tube, respectively; as long as these contacts are open the rotary solenoid 44 is de-energized and the lever 46 is inoperative.

After the head 26 has moved to station A the tube is substantially completely evacuated through the passageways in the head, conduit 40, passageway 38 in the valve, and conduit 42. The head 26 then moves to station B for testing. If the tube has a leak the vacuum on the right hand column 140 of mercury will be lost and the left hand column 142 will rise to the top of the tube completing the solenoid circuit through contacts 144—146. Solenoid 44 will then swing lever 46 in a clockwise direction to engage and pivot lever arm 130 in the head 26 thereby moving the passageway 124 in washer 122 out of alignment with the passageways 96 and 108 to shut off the head.

The action of the solenoid 44 and 46 is fast and shuts off the head before it reaches station C and destroys the vacuum built up in the conduit 42, hence, only the leaking tube is lost and the succeeding good tube is not lost because of insufficient evacuation.

From the foregoing description it will be apparent that the invention is not limited to the particular mechanism shown and described but departures may be made therefrom within the scope of the invention as set forth in the accompanying claims without departing from the principles of the invention and without sacrificing its chief advantages.

I claim:

1. Evacuating apparatus comprising, in combination, a source of vacuum, a head comprising a body member, means in the body member to receive the article to be evacuated, a passageway in the body member between the article-receiving means and the source of vacuum, said body member having a movable portion with a passageway in said portion in alignment with the passageway in the body member leak-detecting means, and means for moving said movable portion of the body member to bring the passageway therein out of alignment with the passageway in the body member whenever a leak is detected in the article being evacuated.

2. Evacuating apparatus as set forth in claim 1 in which the movable portion of the body member is resiliently compressible.

3. Evacuating apparatus comprising, in combination, a source of vacuum, a head comprising a body member, means at one end of the body member to receive the article to be evacuated, a passageway connecting the article-receiving means with the opposite end of the body member, a second body member having a passageway therein in alignment with the passageway in the first-mentioned body member and communicating with the source of vacuum, a movable member interposed between the first- and second-mentioned body members having a passageway in alignment with the passageways in the body members, leak detecting means and means for moving the movable member so that the passageway therein is out of alignment with the passageways in the body members whenever a leak is detected in the article to be evacuated.

4. Evacuating apparatus as set forth in claim 1 having a chamber beneath the article-receiving means, said passageway in the body member communicating with the chamber, and means in the chamber for preventing foreign particles from entering said passageway.

5. Evacuating apparatus as set forth in claim 4 in which the passageway communicates with the chamber at a point above the bottom of the chamber.

6. Evacuating apparatus as set forth in claim 5 wherein said means within the chamber comprises a cylindrical screen covering the entrance to the passageway.

7. Evacuating apparatus as set forth in claim 3 in which the movable member between the body members is provided with a pivoted lever arm and the means for moving the member comprises a rotary solenoid connected to the leak-detecting device and engageable with the lever arm.

8. Evacuating apparatus comprising, in combination, a source of vacuum, a head comprising a main body member, means in the body member to receive the article to be evacuated, a chamber adjacent the article-receiving means, a passageway in the main body member communicating the chamber with one end of the main body member, a screen in the chamber covering the passageway, a secondary body member having a passageway therein in alignment with the passageway in the main body member, said passageway communicating with the vacuum source, a movable resiliently compressible member interposed between said main and secondary body members having a passageway in alignment with the passageways in the body members, leak detecting means, and means for moving the compressible member so as to move the passageway therein out of alignment with the passageways in the body members to shut-off the head whenever a leak is detected.

References Cited in the file of this patent

UNITED STATES PATENTS

| | | |
|---|---|---|
| 398,832 | Henkman | Mar. 5, 1889 |
| 562,049 | Tirmann | June 16, 1896 |
| 784,228 | Richwood | Mar. 7, 1905 |
| 1,216,723 | Pearce | Feb. 20, 1917 |